United States Patent
Ichikawa et al.

(10) Patent No.: US 10,745,004 B2
(45) Date of Patent: Aug. 18, 2020

(54) OBJECT RECOGNIZING DEVICE AND COLLISION AVOIDANCE SYSTEM

(71) Applicant: TOYOTA JIDOSHA KABUSHIKI KAISHA, Toyota-shi, Aichi-ken (JP)

(72) Inventors: Kentaro Ichikawa, Shizuoka-ken (JP); Hiromitsu Urano, Numazu (JP); Yusuke Hayashi, Susono (JP); Bunyo Okumura, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 313 days.

(21) Appl. No.: 15/858,647

(22) Filed: Dec. 29, 2017

(65) Prior Publication Data
US 2018/0201260 A1    Jul. 19, 2018

(30) Foreign Application Priority Data

Jan. 19, 2017 (JP) .................. 2017-007773

(51) Int. Cl.
*B60W 30/09* (2012.01)
*B60W 30/095* (2012.01)
(Continued)

(52) U.S. Cl.
CPC .......... *B60W 30/09* (2013.01); *B60W 30/095* (2013.01); *G01S 7/4808* (2013.01); *G01S 17/46* (2013.01); *G01S 17/58* (2013.01); *G01S 17/66* (2013.01); *G01S 17/86* (2020.01); *G01S 17/89* (2013.01); *G01S 17/931* (2020.01);
(Continued)

(58) Field of Classification Search
CPC .... B60W 30/09; B60W 30/095; G01S 7/4808
See application file for complete search history.

(56) References Cited

U.S. PATENT DOCUMENTS 9,139,202 B2    9/2015   Duncan et al.
2009/0024357 A1   1/2009   Aso et al.
(Continued)

FOREIGN PATENT DOCUMENTS

JP    2007-298430 A    11/2007
JP    2009-042177 A    2/2009
(Continued)

OTHER PUBLICATIONS

M. Himmelsbach et al.: "LIDAR-based 3D Object Perception" (2008).

*Primary Examiner* — Michael D Lang
(74) *Attorney, Agent, or Firm* — Sughrue Mion, PLLC

(57) ABSTRACT

An object recognizing device includes: an other-vehicle recognizing unit configured to recognize another vehicle traveling near the vehicle based on the detection point information of the LIDAR and to recognize a size and a traveling condition of the other vehicle; an other-vehicle tracking unit configured to track the other vehicle based on the detection point information of the LIDAR; and an enlargement determining unit configured to determine whether the size of the other vehicle which is tracked by the other vehicle tracking unit is enlarged, wherein, when the enlargement determining unit determines that the size of the other vehicle has been enlarged, detection points located near the other vehicle before being enlarged are recognized as an object other than the other vehicle.

9 Claims, 9 Drawing Sheets

(51) Int. Cl.
*G01S 17/89* (2020.01)
*G01S 17/66* (2006.01)
*G01S 17/58* (2006.01)
*G01S 17/46* (2006.01)
*B60W 10/20* (2006.01)
*G01S 7/48* (2006.01)
*G01S 17/86* (2020.01)
*G01S 17/931* (2020.01)
H04L 29/08 (2006.01)
B60W 10/04 (2006.01)
B60W 10/18 (2012.01)

(52) U.S. Cl.
CPC ............. *B60W 10/04* (2013.01); *B60W 10/18* (2013.01); *B60W 10/20* (2013.01); *B60W 2420/52* (2013.01); *B60W 2554/00* (2020.02); *B60W 2754/10* (2020.02); *H04L 67/12* (2013.01)

(56) References Cited

U.S. PATENT DOCUMENTS

2015/0142208 A1\* 5/2015 Ito .......................... B60W 30/09
                                                                              701/1
2015/0197246 A1   7/2015 Nagasaka et al.

FOREIGN PATENT DOCUMENTS

| JP | 2016-522886 A | 8/2016 |
| WO | 2007/102367 A1 | 9/2007 |
| WO | 2014/168851 A1 | 10/2014 |

\* cited by examiner

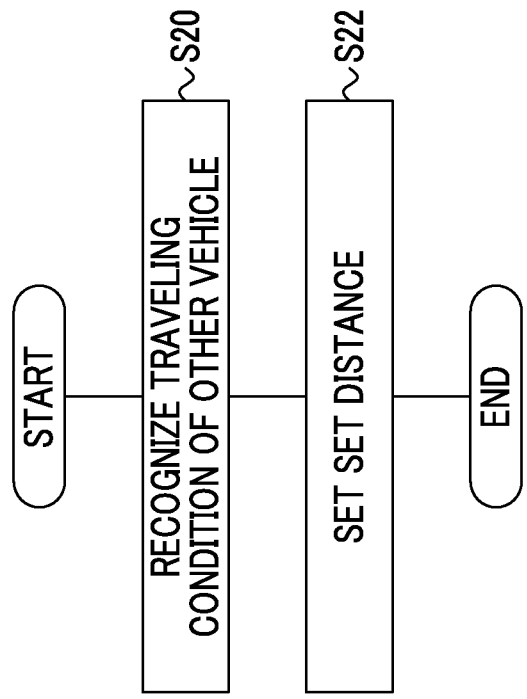
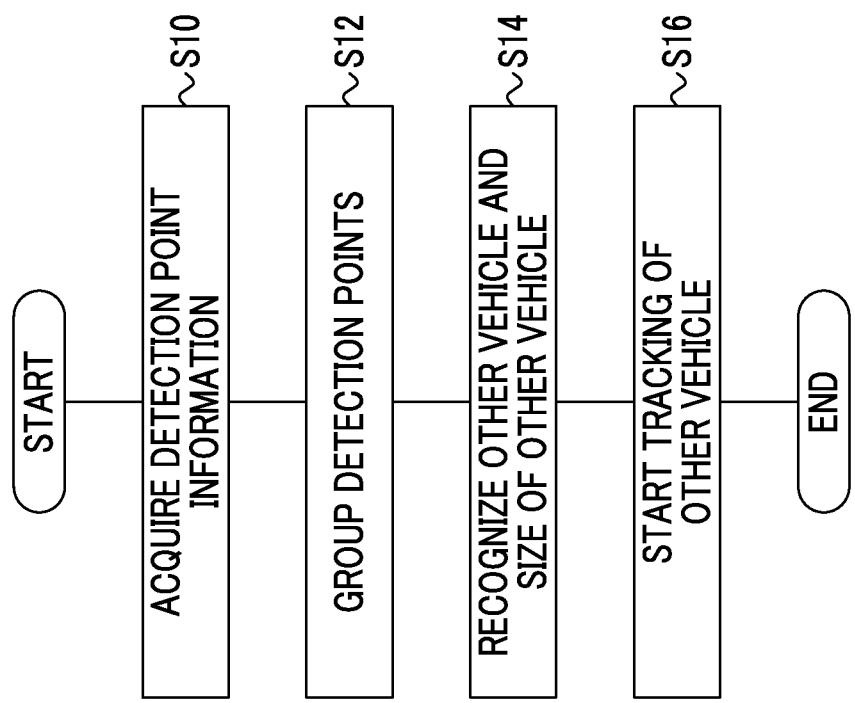

OBJECT RECOGNIZING DEVICE AND COLLISION AVOIDANCE SYSTEM

INCORPORATION BY REFERENCE

The disclosure of Japanese Patent Application No. 2017-007773 filed on Jan. 19, 2017 including the specification, drawings and abstract is incorporated herein by reference in its entirety.

BACKGROUND

1. Technical Field

The disclosure relates to an object recognizing device and a collision avoidance system.

2. Description of Related Art

In the related art, Japanese Unexamined Patent Application Publication No. 2009-42177 (JP 2009-42177 A) is known as a technical document relevant to detection of an object near a vehicle. An object detecting device that determines whether there is an irregularly shaped object such as fog or vapor using a light detection and ranging (LIDAR) is described in the publication. In the object detecting device, from the fact that a penetrable object (an irregularly shaped object) such as fog or vapor reflects only a part of light emitted from the LIDAR and the other light penetrates the penetrable object and is secondly reflected from a road surface or the like, it is determined whether there is a penetrable object based on a ratio of reflection points in the first reflection and reflection points in the second reflection.

SUMMARY

However, in the object detecting device according to the related art, when a distance between another vehicle and a penetrable object such as an exhaust gas (for example, an exhaust gas in which particles are condensed at a low temperature) generated near the other vehicle is small, there is a likelihood that the exhaust gas and a part of the other vehicle will be erroneously recognized as one object.

Therefore, in the art, there is demand for providing an object recognizing device and a collision avoidance system that can appropriately recognize an object other than the other vehicle.

An object recognizing device according to a first aspect of the disclosure recognizes an object near a vehicle based on detection point information output by a light detection and ranging which is mounted in the vehicle. The object recognizing device includes: an other-vehicle recognizing unit configured to recognize existence of another vehicle traveling near the vehicle based on the detection point information and to recognize a size of the other vehicle; an other-vehicle tracking unit configured to track the other vehicle based on the size of the other vehicle which is recognized by the other-vehicle recognizing unit; and an enlargement determining unit configured to determine whether the size of the other vehicle which is tracked by the other-vehicle tracking unit is enlarged; wherein a result is output when the enlargement determining unit determines that the size of the other vehicle has been enlarged, the result being that detection points located near the other vehicle before being enlarged among detection points are recognized as an object other than the other vehicle, the detection points being detected by the light detection and ranging.

When it is determined that the size of the other vehicle which is tracked has been enlarged based on the detection point information, the size of the other vehicle is considered to be enlarged by the object other than the other vehicle, for example a nearby object getting too close to the other vehicle, or a penetrable object such as an exhaust gas or a spray of water generated near the other vehicle. Accordingly, in the object recognizing device according to the aspect of the disclosure, the object recognizing device can appropriately recognize the object other than the other vehicle.

In the aspect, the object recognizing device may further include: a "lost" determining unit configured to determine whether a nearby object near the other vehicle has been lost based on the detection point information when the enlargement determining unit determines that the size of the other vehicle has been enlarged; and a penetrable object recognizing unit configured to recognize the detection points located near the other vehicle before being enlarged among the detection points detected by the light detection and ranging as a penetrable object when the "lost" determining unit determines that the nearby object has not been lost.

When it is determined that the size of the other vehicle which is tracked has been enlarged based on the detection point information and it is determined that a nearby object has not been lost, the size of the other vehicle is considered to be enlarged by a penetrable object such as an exhaust gas or a spray of water generated near the other vehicle and thus the detection points located near the other vehicle before being enlarged are recognized as a penetrable object. Accordingly, in the object recognizing device, the object recognizing device can appropriately recognize a penetrable object generated near another vehicle.

In the aspect, the penetrable object recognizing unit may recognize the detection points located within a set distance from the other vehicle before being enlarged as the penetrable object. Since the object recognizing device can recognize the detection points located within the set distance from the other vehicle as a penetrable object, it is possible to easily recognize a penetrable object.

In the aspect, the other-vehicle recognizing unit may recognize the traveling condition of the other vehicle based on the detection point information and the penetrable object recognizing unit may set the set distance based on the traveling condition of the other vehicle. In the object recognizing device, since a range of an exhaust gas or a spray of water is considered to be affected by the traveling condition of the other vehicle, it is possible to appropriately recognize a penetrable object by setting the set distance based on the traveling condition of the other vehicle.

In the aspect, the other-vehicle recognizing unit may be configured to recognize a vehicle speed of the other vehicle based on the detection point information, and the penetrable object recognizing unit may be configured to recognize the detection points located within a first distance from a lateral side of the other vehicle before being enlarged as the penetrable object and to set the first distance to be longer when the vehicle speed of the other vehicle is equal to or higher than a vehicle speed threshold value than when the vehicle speed of the other vehicle is lower than the vehicle speed threshold value. In the object recognizing device, from the fact that a range of a spray of water or the like is considered to extend to a lateral side of the other vehicle when the vehicle speed of the other vehicle increases, it is possible to appropriately recognize a penetrable object such as a spray of water by setting the first distance to be longer when the vehicle speed of the other vehicle is equal to or higher than the vehicle speed threshold value than when the vehicle speed of the other vehicle is lower than the vehicle speed threshold value.

In the aspect, the other-vehicle recognizing unit may be configured to recognize a total length of the other vehicle based on the detection point information, and the penetrable object recognizing unit may be configured to recognize the detection points located within a first distance from a lateral side of the other vehicle before being enlarged as the penetrable object and to set the first distance to be longer when the total length of the other vehicle is equal to or greater than a length threshold value than when the total length of the other vehicle is less than the length threshold value. In the object recognizing device, from the fact that the number of vehicle wheels of the other vehicle is considered to be larger or the weight of the other vehicle is considered to be large and a range of a spray of water or the like is considered to extend to a lateral side of the other vehicle when the total length of the other vehicle increases, it is possible to appropriately recognize a penetrable object such as a spray of water by setting the first distance to be longer when the total length of the other vehicle is equal to or greater than the length threshold value than when the total length of the other vehicle is less than the length threshold value.

In the aspect, the other-vehicle recognizing unit may be configured to recognize an acceleration of the other vehicle based on the detection point information, and the penetrable object recognizing unit may be configured to recognize the detection points located within a second distance from a rear side of the other vehicle before being enlarged as the penetrable object and to set the second distance to be longer when the acceleration of the other vehicle is equal to or higher than an acceleration threshold value than when the acceleration of the other vehicle is lower than the acceleration threshold value. In the object recognizing device, from the fact that a range of an exhaust gas or the like is considered to extend rearward from the other vehicle when the acceleration of the other vehicle increases, it is possible to appropriately recognize a penetrable object such as an exhaust gas by setting the second distance to be longer when the acceleration of the other vehicle is equal to or higher than the acceleration threshold value than when the acceleration of the other vehicle is lower than the acceleration threshold value.

According to a second aspect of the disclosure, there is provided a collision avoidance system that performs collision avoidance control for avoiding collision of the vehicle with an obstacle which is to be avoided by the vehicle. The collision avoidance system includes: the above-mentioned object recognizing device; a collision avoidance course generating unit configured to generate a collision avoidance course in which collision of the vehicle with the obstacle is avoided based on the detection point information and to generate the collision avoidance course in which contact of the vehicle with the penetrable object is permitted when the penetrable object recognizing unit recognizes the penetrable object in front of the vehicle; and a collision avoidance control unit configured to perform the collision avoidance control of the vehicle along the collision avoidance course.

In the collision avoidance system according to the aspect of the disclosure, since a collision avoidance course in which contact of the vehicle with the penetrable object is permitted can be generated by appropriately recognizing the penetrable object using the object recognizing device, it is possible to prevent a penetrable object from being erroneously recognized as an obstacle which should be avoided and narrowing choices for the collision avoidance course.

In the aspect, the collision avoidance control unit may set a priority level of the collision avoidance course in which a closest approach distance between the vehicle and the obstacle is equal to or greater than the approach threshold value and the vehicle comes in contact with the penetrable object to be higher than a priority level of the collision avoidance course in which the closest approach distance between the vehicle and the obstacle is less than an approach threshold value. In the collision avoidance system, since the priority level of the collision avoidance course in which the closest approach distance between the vehicle and the obstacle is equal to or greater than the approach threshold value and contact of the vehicle with the penetrable object is permitted is set to be higher than the priority level of the collision avoidance course in which the closest approach distance between the vehicle is less than the threshold value, it is possible to prevent a contact risk between the vehicle and the obstacle from increasing due to presence of the penetrable object.

An object recognizing device according to a third aspect of the disclosure is configured to recognize an object near a vehicle based on detection point information output by a light detection and ranging which is mounted in the vehicle. The object recognizing device includes an electronic control unit configured to: recognize existence of another vehicle traveling near the vehicle and a size of the other vehicle based on the detection point information; track the other vehicle based on the size of the other vehicle; determine whether the size of the other vehicle which is tracked is enlarged; and output a result when it is determined that the size of the other vehicle has been enlarged, the result being that detection points located near the other vehicle before being enlarged among detection points are recognized as an object other than the other vehicle, the detection points being detected by the light detection and ranging.

As described above, according to one or more aspects of the disclosure, it is possible to appropriately recognize a penetrable object near another vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5A is a flowchart illustrating a process routine of recognizing another vehicle;

FIG. 5B is a flowchart illustrating a process routine of setting a set distance;

DETAILED DESCRIPTION OF EMBODIMENTS

Hereinafter, embodiments of the disclosure will be described with reference to the accompanying drawings.

Figure 1:
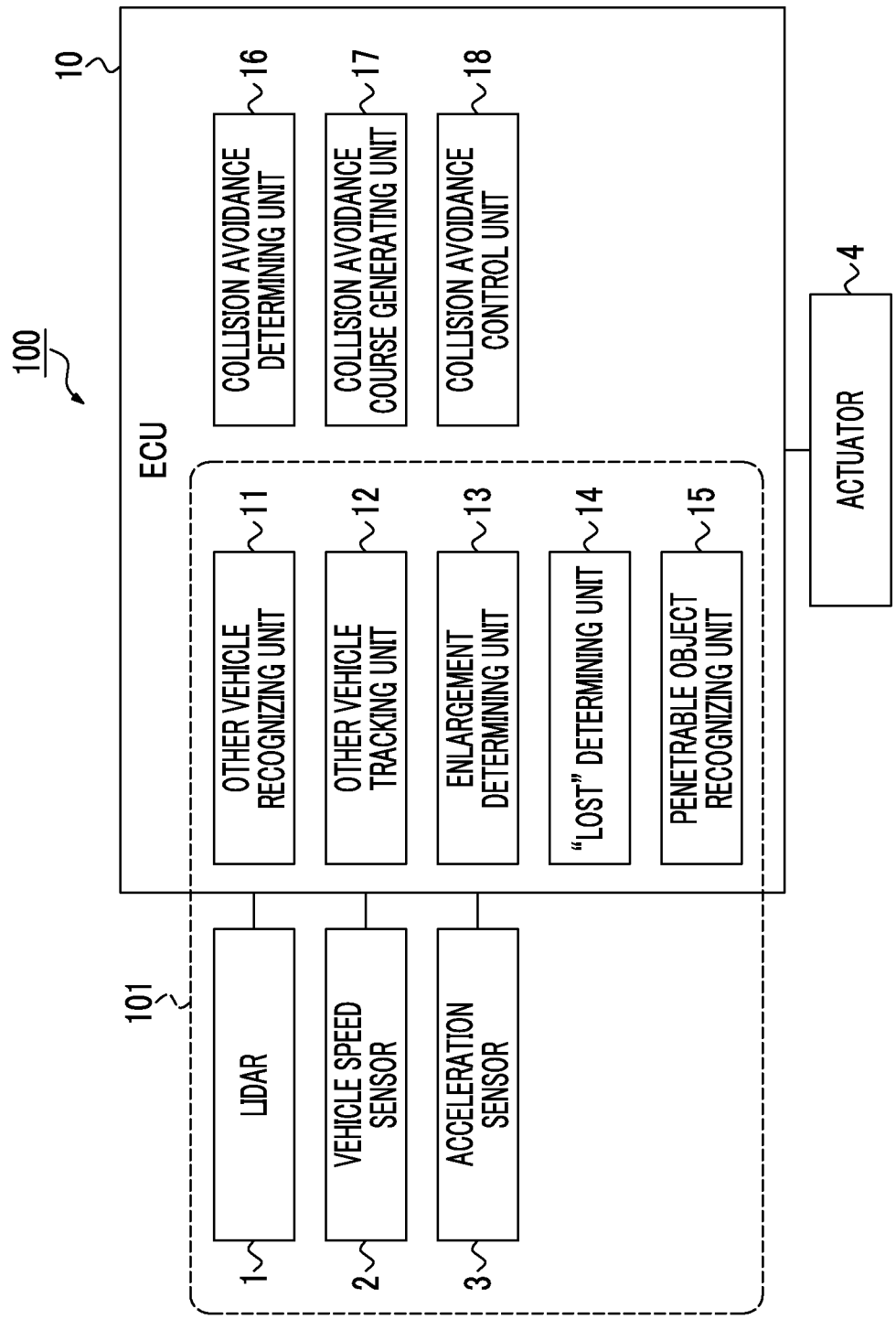
FIG. 1 is a block diagram illustrating a collision avoidance system according to a first embodiment.

[First embodiment] FIG. 1 is a block diagram illustrating a collision avoidance system according to a first embodiment. A collision avoidance system 100 illustrated in FIG. 1 is mounted in a vehicle such as an automobile (hereinafter referred to as a vehicle of interest). The collision avoidance system 100 includes an object recognizing device 101 that recognizes an object near the vehicle of interest and performs collision avoidance control for avoiding collision of the vehicle of interest with an obstacle which should be avoided by the vehicle of interest. Details of the obstacle will be described later.

[Configuration of collision avoidance system according to first Embodiment] A configuration of the collision avoidance system 100 according to the first embodiment will be described below with reference to the drawings. As illustrated in FIG. 1, the collision avoidance system 100 includes an electronic control unit (ECU) 10 that comprehensively controls the system. The configuration of the object recognizing device 101 included in the collision avoidance system 100 will be described later.

The ECU 10 is an electronic control unit that includes a central processing unit (CPU), a read only memory (ROM), a random access memory (RAM), and a controller area network (CAN) communication circuit. In the ECU 10, various functions are realized, for example, by loading a program stored in the ROM to the RAM and causing the CPU to execute the program loaded to the RAM. The ECU 10 may include a plurality of electronic units. The ECU 10 is connected to a light detection and ranging (LIDAR) 1, a vehicle speed sensor 2, and an actuator 4.

The LIDAR 1 is a detection device that detects an object near the vehicle of interest using light. The LIDAR 1 detects an object by transmitting light from the vehicle of interest and receiving light reflected from an object. The LIDAR 1 detects points from which the transmitted light is reflected as detection points. The LIDAR 1 transmits detection point information which is information on the detected detection points to the ECU 10.

The vehicle speed sensor 2 is a detection device that detects a vehicle speed of the vehicle of interest. A wheel speed sensor which detects a rotation speed of the vehicle wheel is used as the vehicle speed sensor 2. The wheel speed sensor is disposed on a vehicle wheel of the vehicle of interest, a drive shaft rotating together with the vehicle wheel, or the like. The vehicle speed sensor 2 transmits information on the detected vehicle speed (wheel speed information) to the ECU 10.

An acceleration sensor 3 is a detection device that detects an acceleration (a longitudinal acceleration) of the vehicle of interest. The acceleration sensor 3 transmits information on the detected acceleration to the ECU 10.

The actuator 4 is a device that is used to control the vehicle of interest. The actuator 4 includes at least a throttle actuator, a brake actuator, and a steering actuator. The throttle actuator controls an amount of air supplied to an engine (a throttle valve opening degree) in accordance with a control signal from the ECU 10 and controls a driving force of the vehicle of interest. When the vehicle of interest is a hybrid vehicle, in addition to the amount of air supplied to the engine, a driving force of a motor as a power source is controlled in accordance with a control signal from ECU10. When the vehicle of interest is an electric vehicle, a control signal from the ECU 10 is input to a motor serving as a power source to control a driving force thereof. The motor serving as the power source constitutes the actuator 4.

The brake actuator controls a brake system in accordance with a control signal from the ECU 10 and controls a braking force which is applied to the vehicle wheels of the vehicle of interest. For example, a hydraulic brake system is used as the brake system. The steering actuator controls driving of an assist motor that controls a steering torque in an electric power steering system in accordance with a control signal from the ECU 10. Accordingly, the steering actuator controls the steering torque of the vehicle of interest.

A functional configuration of the ECU 10 will be described below. The ECU 10 includes an other-vehicle recognizing unit 11, an other-vehicle tracking unit 12, an enlargement determining unit 13, a "lost" determining unit 14, a penetrable object recognizing unit 15, a collision avoidance determining unit 16, a collision avoidance course generating unit 17, and a collision avoidance control unit 18. Some of the functions of the ECU 10 which will be described below may be performed by a server of a facility such as a management center that can communicate with the vehicle of interest.

The other-vehicle recognizing unit 11 recognizes another vehicle traveling near the vehicle of interest based on detection point information of the LIDAR 1. A region near the vehicle of interest corresponds to, for example, a detection range of the LIDAR 1. Specifically, when the detection point information of the LIDAR 1 has been acquired, the other-vehicle recognizing unit 11 performs grouping of detected points based on the detection point information of the LIDAR 1. Grouping of the detection points refers to grouping detection points which satisfy a predetermined condition (that the detection points are located within a predetermined distance from each other) among a plurality of detection points as detection points indicating the same object.

The other-vehicle recognizing unit 11 recognizes another vehicle located near the vehicle of interest (recognizes a position of another vehicle) by performing pattern recognition on the grouped detection points using a predetermined vehicle model.

The other-vehicle recognizing unit 11 recognizes a traveling condition of the other vehicle based on the detection point information of the LIDAR 1, the vehicle speed information of the vehicle speed sensor 2, and the acceleration information of the acceleration sensor 3 using a known technique. The traveling condition of the other vehicle includes a vehicle speed of the other vehicle and an acceleration of the other vehicle. The other-vehicle recognizing unit 11 recognizes the vehicle speed of the other vehicle based on a relative velocity of the other vehicle to the vehicle of interest and a vehicle speed of the vehicle of interest. The relative velocity is acquired from the detection point information of the LIDAR 1. The vehicle speed of the vehicle of interest is acquired from the vehicle speed information of the vehicle speed sensor 2. The other-vehicle recognizing unit 11 recognizes the acceleration of the other vehicle based on a relative acceleration of the other vehicle to the vehicle of interest and the acceleration of the vehicle of interest. The relative acceleration is acquired from the detection point information of the LIDAR 1. The acceleration of the vehicle of interest is acquired from the acceleration information of the acceleration sensor 3.

The other-vehicle recognizing unit 11 recognizes the size of the other vehicle based on the detection point information of the LIDAR 1. The other-vehicle recognizing unit 11 recognizes the size of the other vehicle from the detection points which are grouped as the other vehicle. The other-vehicle recognizing unit 11 provides a recognizable rectangular parallelepiped (a virtual rectangular parallelepiped) including the grouped detection points based on, for example, an outline of the grouped detection points (that is, a point group). Then, the other-vehicle recognizing unit 11 recognizes the size (the total length, the width, and the height) of the rectangular parallelepiped as the size of the other vehicle. The other-vehicle recognizing unit 11 is not limited to the above-mentioned technique and may recognize the other vehicle (recognize a position, a traveling condition, and a size of another vehicle) located near the vehicle of interest using a known technique.

When the other-vehicle recognizing unit 11 recognizes the other vehicle, the other-vehicle recognizing unit 11 recognizes a nearby object near the other vehicle based on the detection point information of the LIDAR 1. The nearby object can be defined as an object other than a penetrable object which will be described later among objects located within a predetermined distance from the other vehicle. The nearby object includes, for example, a vehicle (which includes a parked vehicle in addition to a traveling vehicle), a bicycle, and a pedestrian. The nearby object may include fixed objects such as trees and electric poles and parts of the fixed objects. The nearby object may be limited to an object which is located within a predetermined distance from the other vehicle and an object of which a speed difference from the other vehicle is equal to or less than a predetermined threshold value. The other-vehicle recognizing unit 11 may recognize a plurality of nearby objects for a single other vehicle.

Figure 2A:
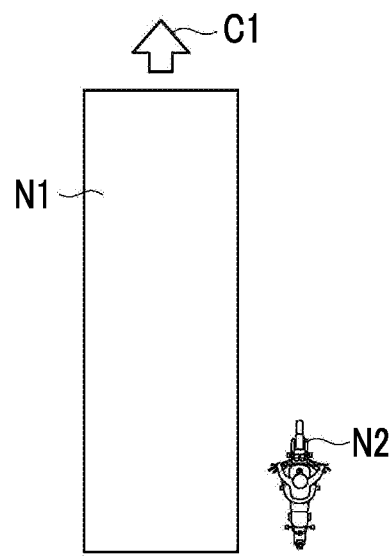
FIG. 2A is a plan view illustrating a nearby object near another vehicle.

FIG. 2A is a plan view illustrating a nearby object traveling near another vehicle. Another vehicle N1 and a nearby object N2 are illustrated in FIG. 2A. In FIG. 2A, the other vehicle N1 is a large-sized bus. The nearby object N2 is a motorcycle. The other vehicle N1 is assumed to be a vehicle of which an exhaust pipe is directed rearward from the other vehicle N1.

The other-vehicle tracking unit 12 tracks the other vehicle N1 which has been recognized by the other-vehicle recognizing unit 11 using a known technique based on the detection point information of the LIDAR 1. The other-vehicle tracking unit 12 continues to recognize the size of the other vehicle N1 based on the detection point information of the LIDAR 1. The other-vehicle tracking unit 12 stores the size of the other vehicle N1. When the other-vehicle recognizing unit 11 has recognized the nearby object N2, the other-vehicle tracking unit 12 also tracks the nearby object N2.

The enlargement determining unit 13 determines whether the size of the other vehicle N1 which is tracked by the other-vehicle tracking unit 12 has been enlarged. Enlargement of the size of the other vehicle N1 means that a space occupied by the detection points grouped as the other vehicle N1 is enlarged.

The enlargement determining unit 13 may use only another vehicle located in front of the vehicle of interest among other vehicles which are tracked by the other-vehicle tracking unit 12 as a determination target. The other vehicle located in front of the vehicle of interest includes another vehicle which travels in a neighboring lane adjacent to a traveling lane of the vehicle of interest in front of the vehicle of interest. The other vehicle located in front of the vehicle of interest may include another vehicle which travels in an on-coming lane in front of the vehicle of interest.

The "lost" determining unit 14 determines whether the nearby object N2 of the other vehicle N1 has been lost. "Lost" of the nearby object N2 means that the other-vehicle tracking unit 12 can no longer recognize the nearby object N2 based on the detection point information of the LIDAR 1. Specifically, "lost" of the nearby object N2 occurs when the nearby object N2 departs from a detection range of the LIDAR 1 or when the nearby object N2 gets too close to the other vehicle N1 and is erroneously recognized as a part of the other vehicle N1.

Figure 2B:
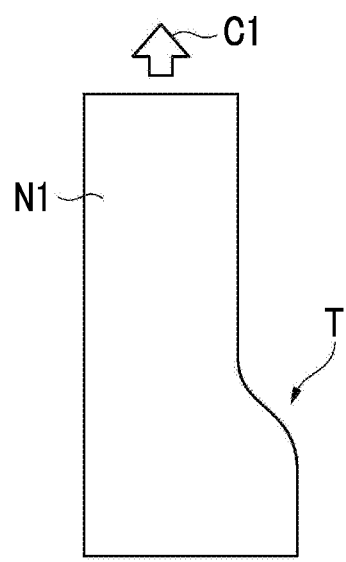
FIG. 2B is a plan view illustrating a situation in which a nearby object is lost and is erroneously recognized as a part of another vehicle.

FIG. 2B is a plan view illustrating a situation in which the nearby object N2 is lost and is erroneously recognized as a part of the other vehicle N1. As illustrated in FIG. 2B, when the nearby object N2 and the other vehicle N1 get too close to each other, the detection points grouped as the nearby object N2 and the detection points grouped as the other vehicle N1 satisfy a same grouping condition. Thus, the nearby object N2 is erroneously recognized as a part T of the other vehicle N1. When the nearby object N2 is erroneously recognized as a part T of the other vehicle N1, the enlargement determining unit 13 determines that the size of the other vehicle N1 has been enlarged.

In FIG. 2B, the other vehicle N1 having the part T as a protruding shape is illustrated for the purpose of easy understanding, but the other-vehicle tracking unit 12 may recognize the other vehicle N1 as a rectangular parallelepiped including the part T. When the other-vehicle recognizing unit 11 and the other-vehicle tracking unit 12 do not recognize the nearby object N2 near the other vehicle N1 (when the nearby object N2 is not present), the "lost" determining unit 14 determines that the nearby object N2 has not been lost.

When the enlargement determining unit 13 determines that the size of the other vehicle N1 has been enlarged and when the "lost" determining unit 14 determines that the nearby object N2 of the other vehicle N1 has not been lost, the penetrable object recognizing unit 15 recognizes the detection points located near the other vehicle N1 before being enlarged among the detection points detected by the LIDAR 1 as a penetrable object. Concretely, among the detection points detected by the LIDAR1, the detection points located near the detection points detected as the other vehicle N1 before enlarged are recognized as the penetrable object.

A penetrable object is an object which can be penetrated by the vehicle of interest, such as an exhaust gas and a spray of water generated due to the traveling other vehicle N1. The penetrable object may include ice and snow raised due to the traveling of the other vehicle N1 or may include a cloud of dust raised due to the traveling of the other vehicle N1.

A reason why it is determined that the size of the traveling other vehicle N1 has been enlarged is generally that the other object is erroneously recognized as a part of the other vehicle N1 by the other vehicle N1 and another object getting to close to each other. The nearby object N2 and the penetrable object generated due to the other vehicle are considered as objects which are erroneously recognized as a part of the other vehicle N1. As illustrated in FIGS. 2A and 2B, when it is determined that the size of the other vehicle N1 has been enlarged due to erroneous recognition of the nearby object N2 as a part T of the other vehicle N1, the "lost" determining unit 14 determines that the nearby object N2 has been lost.

On the other hand, when it is determined that the size of the other vehicle N1 has been enlarged due to erroneous recognition of a penetrable object as a part T of the other vehicle N1, it is not determined that the nearby object N2 has been lost. Accordingly, when the enlargement determining unit 13 determines that the size of the other vehicle N1 has been enlarged and the "lost" determining unit 14 determines that the nearby object N2 near the other vehicle N1 has not been lost, from the fact that the size of the other vehicle N1 is considered to have been enlarged by the penetrable object generated due to the other vehicle N1, the penetrable object recognizing unit 15 recognizes the detection points located near the other vehicle N1 before being enlarged as a penetrable object.

Figure 3A:
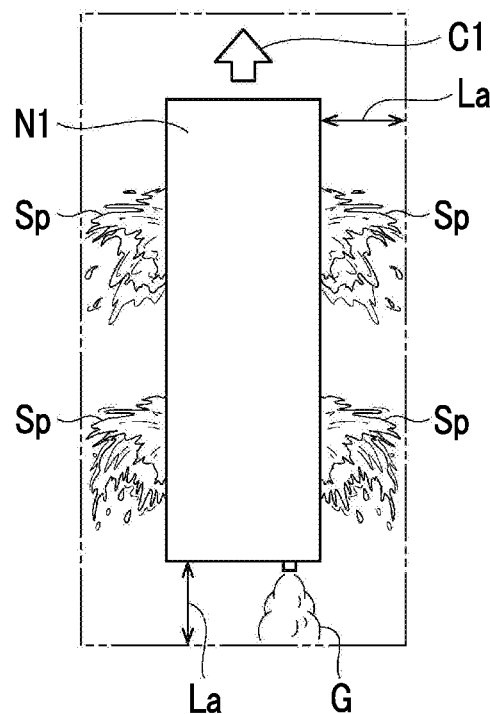
FIG. 3A is a plan view illustrating recognition of a penetrable object according to the first embodiment.

Specifically, the penetrable object recognizing unit 15 recognizes the detection points located within a set distance La from the other vehicle N1 before being enlarged as a penetrable object. Concretely, the penetrable object recognizing unit 15 recognizes the detection points located in a rectangular area which is surrounding the other vehicle and is set such that the distance between each side of the other vehicle and the corresponding side of the rectangular area is the set distance La. The set distance La will be described later. FIG. 3A is a plan view illustrating recognition of a penetrable object in the first embodiment. The set distance La from the other vehicle N1, a spray of water Sp which is generated due to the other vehicle N1, and an exhaust gas G of the other vehicle N1 are illustrated in FIG. 3A. The sprays of water Sp and the exhaust gas G are illustrated as figures for the purpose of easy understanding, but for example, the sprays of water Sp and the exhaust gas G are detected as diverging detection points in the detection point information of the LIDAR 1. In the situation illustrated in FIG. 3A, the penetrable object recognizing unit 15 recognizes the sprays of water Sp and the exhaust gas G (the detection points generated by the sprays of water Sp and the exhaust gas G) within the set distance La from the other vehicle N1 before being enlarged as penetrable objects.

The penetrable object recognizing unit 15 sets the set distance La based on the traveling condition of the other vehicle N1 which is recognized by the other-vehicle tracking unit 12. From the fact that a range of the sprays of water Sp or the like generated due to the other vehicle N1 is considered to extend as the vehicle speed of the other vehicle N1 increases, the penetrable object recognizing unit 15 sets the set distance La to be longer when the vehicle speed of the other vehicle N1 is equal to or greater than a vehicle speed threshold value than when the vehicle speed of the other vehicle N1 is less than the vehicle speed threshold value. The vehicle speed threshold value is a preset value. The vehicle speed threshold value may be a fixed value or may be a varying value.

Similarly, from the fact that a range of the exhaust gas G or the like generated due to the other vehicle N1 is considered to extend as the acceleration of the other vehicle N1 increases, the penetrable object recognizing unit 15 sets the set distance La to be longer when the acceleration of the other vehicle N1 is equal to or greater than an acceleration threshold value than when the acceleration of the other vehicle N1 is less than the acceleration threshold value. The range of the exhaust gas G is a range in which exists the exhaust gas G which can be detected by the LIDAR 1 because of insufficient diffusion of the exhaust gas G. The acceleration threshold value is a preset value. The acceleration threshold value may be a fixed value or may be a varying value.

The penetrable object recognizing unit 15 may set the set distance La based on the total length of the other vehicle N1 which is recognized by the other-vehicle tracking unit 12. The total length of the other vehicle N1 is a length in a front-rear direction of the other vehicle N1 before being enlarged. From the fact that a range of the spray of water Sp or the like generated due to the other vehicle N1 is considered to extend as the length of the other vehicle N1 increases, the penetrable object recognizing unit 15 may set the set distance La to be longer when the total length of the other vehicle N1 is equal to or greater than a length threshold value than when the total length of the other vehicle N1 is less than the length threshold value. The length threshold value is a preset value. The length threshold value may be a fixed value or may be a varying value.

Setting of the set distance La is not limited to the above description. The penetrable object recognizing unit 15 may set the set distance La to increase continuously or stepwise as the vehicle speed of the other vehicle N1 increases. Similarly, the penetrable object recognizing unit 15 may set the set distance La to increase continuously or stepwise as the acceleration of the other vehicle N1 increases. The set distance La may be a fixed value. In this case, the other-vehicle recognizing unit 11 may not recognize the traveling condition of the other vehicle N1. The vehicle speed sensor 2 and the acceleration sensor 3 are not necessary.

As illustrated in FIG. 1, the LIDAR 1, the other-vehicle recognizing unit 11, the other-vehicle tracking unit 12, the enlargement determining unit 13, the "lost" determining unit 14, and the penetrable object recognizing unit 15 constitute the object recognizing device 101 that recognizes an object near the vehicle of interest.

The collision avoidance determining unit 16 determines whether there is a likelihood of collision of the vehicle of interest with an obstacle in the traveling direction of the vehicle of interest based on the detection point information of the LIDAR 1. An obstacle is an object such as a vehicle or an electric pole which should be avoided by the vehicle of interest. The obstacle does not include a penetrable object.

When a time-to-collision (TTC) of the vehicle of interest with an obstacle is equal to or less than a predetermined threshold value, the collision avoidance determining unit 16 determines that there is a likelihood of collision of the vehicle of interest with the obstacle in the traveling direction of the vehicle of interest. The collision avoidance determining unit 16 may determine whether there is a likelihood of collision of the vehicle of interest with the obstacle in the traveling direction of the vehicle of interest using a known technique without being limited to the above-mentioned technique.

When the collision avoidance determining unit 16 determines that there is a likelihood of collision of the vehicle of interest with the obstacle in the traveling direction of the vehicle of interest, the collision avoidance determining unit 16 determines whether a penetrable object has been recognized in front of the vehicle of interest by the penetrable object recognizing unit 15.

When the collision avoidance determining unit 16 determines that there is a likelihood of collision of the vehicle of interest with the obstacle in the traveling direction of the vehicle of interest, the collision avoidance course generating unit 17 generates a collision avoidance course for avoiding collision of the vehicle of interest with the obstacle based on the detection point information of the LIDAR 1. The collision avoidance course generating unit 17 generates the collision avoidance course using a known technique.

When the penetrable object recognizing unit 15 recognizes a penetrable object in front of the vehicle of interest, the collision avoidance course generating unit 17 generates a collision avoidance course in which contact of the vehicle of interest with the penetrable object is permitted. The collision avoidance course generating unit 17 does not need to always generate a collision avoidance course in which the vehicle of interest comes in contact with the penetrable object.

Figure 4:
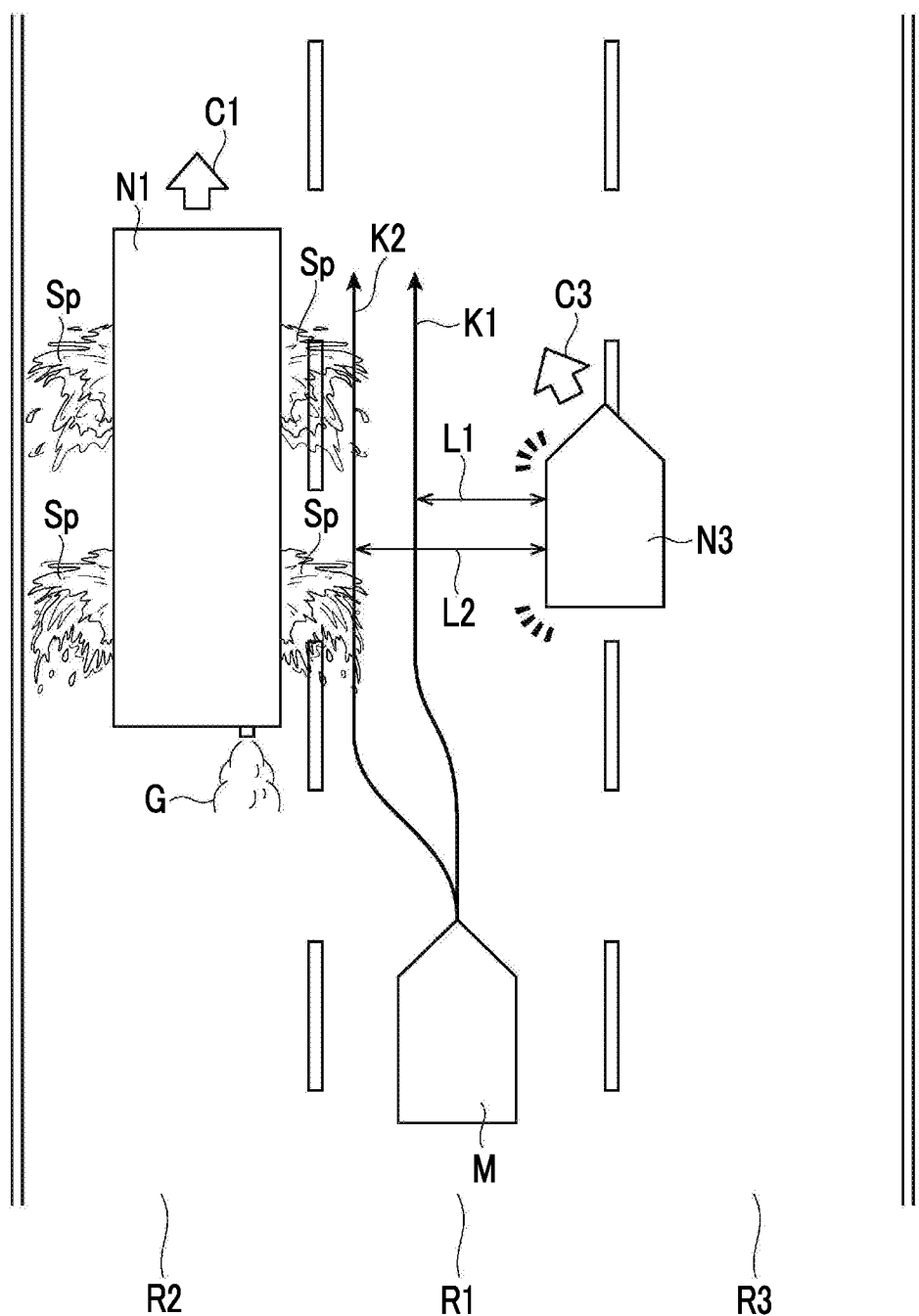
FIG. 4 is a plan view illustrating generation of a collision avoidance course in which contact of a vehicle with a penetrable object is permitted.

FIG. 4 is a plan view illustrating generation of a collision avoidance course in which contact of the vehicle of interest with a penetrable object is permitted. A vehicle of interest M, a traveling lane R1 in which the vehicle of interest M travels, a left neighboring lane R2 of the traveling lane R1, a right neighboring lane R3 of the traveling lane R1, a lane changing vehicle N3, a traveling direction C3 of the lane changing vehicle N3, collision avoidance courses K1 and K2, a closest approach distance L1 between the collision avoidance course K1 and the lane changing vehicle N3, and a closest approach distance L2 between the collision avoidance course K2 and the lane changing vehicle N3 are illustrated in FIG. 4. The other vehicle N1 travels in the neighboring lane R2 in front of the vehicle of interest M. The lane changing vehicle N3 is a vehicle that is changing its lane from the neighboring lane R3 to the traveling lane R1 in front of the vehicle of interest M. FIG. 4 illustrates a situation in which the vehicle of interest M travels at a vehicle speed higher than that of the lane changing vehicle N3 and avoids collision by passing by a lateral side of the lane changing vehicle N3 instead of using quick braking.

In the situation illustrated in FIG. 4, the penetrable object recognizing unit 15 recognizes the spray of water Sp and the exhaust gas G of the other vehicle N1 as penetrable objects. The collision avoidance determining unit 16 determines that there is a likelihood of collision of the vehicle of interest M with the lane changing vehicle N3. In this situation, the collision avoidance course generating unit 17 generates a collision avoidance course K1 passing between the lane changing vehicle N3 and the spray of water Sp of the other vehicle N1 and a collision avoidance course K2 in which contact of the vehicle of interest M with the penetrable object (such as the spray of water Sp) is permitted.

The collision avoidance control unit 18 performs collision avoidance control of avoiding collision of the vehicle of interest M with an obstacle (such as the lane changing vehicle N3 in FIG. 4) by causing the vehicle of interest M to travel according to the collision avoidance course generated by the collision avoidance course generating unit 17. The collision avoidance control unit 18 performs the collision avoidance control by transmitting a control signal to the actuator 4. The collision avoidance control unit 18 can perform the collision avoidance control using a known technique.

When the collision avoidance course generating unit 17 generates a plurality of collision avoidance courses, the collision avoidance control unit 18 gives priority levels to the collision avoidance courses and employs the collision avoidance course having a highest priority level. The collision avoidance control unit 18 sets the priority level of the collision avoidance course in which the closest approach distance between the vehicle of interest M and the obstacle is equal to or greater than an approach threshold value and the vehicle of interest M comes in contact with the penetrable object to be higher than the priority level of the collision avoidance course in which the closest approach distance between the vehicle of interest M and the obstacle is less than the approach threshold value. The approach threshold value is a preset value. The approach threshold value may be a fixed value or may be a varying value.

Specifically, in the situation illustrated in FIG. 4, the closest approach distance L1 between the collision avoidance course K1 and the lane changing vehicle N3 is assumed to be a distance less than the approach threshold value. The closest approach distance L2 between the collision avoidance course K2 and the lane changing vehicle N3 is assumed to be a distance equal to or greater than the approach threshold value. In this case, the collision avoidance control unit 18 sets the priority level of the collision avoidance course K2 in which the closest approach distance L2 between the vehicle of interest M and the lane changing vehicle N3 is equal to or greater than the approach threshold value and the vehicle of interest M comes in contact with the penetrable object to be higher than the priority level of the collision avoidance course K1 in which the closest approach distance L1 between the vehicle of interest M and the lane changing vehicle N3 is less than the approach threshold value. The collision avoidance control unit 18 performs the collision avoidance control of causing the vehicle of interest M to travel according to the collision avoidance course K2. In other words, the collision avoidance control unit 18 sets the priority level of collision avoidance for the penetrable object to be lower than the priority level of collision avoidance for an obstacle such as a vehicle or a structure.

Accordingly, the collision avoidance control unit 18 can perform collision avoidance control of causing the vehicle of interest M to pass through the penetrable object such as the spray of water Sp and to avoid collision with a sufficient distance from the lane changing vehicle N3 in comparison with a conventional technique in which the spray of water Sp is erroneously recognized as a part of the other vehicle N1. When there is no obstacle in the traveling direction of the vehicle of interest M, or the like, the collision avoidance control unit 18 may avoid contact of the vehicle of interest M with the penetrable object such as the spray of water Sp and the exhaust gas G.

[Process routine of collision avoidance system according to first embodiment] A process routine which is performed by the collision avoidance system 100 (the object recognizing device 101) according to the first embodiment will be described below.

[Process routine of recognizing other vehicle] FIG. 5A is a flowchart illustrating a process routine of recognizing another vehicle. The flowchart illustrated in FIG. 5A is performed while the vehicle of interest M is traveling.

As illustrated in FIG. 5A, the ECU 10 of the collision avoidance system 100 acquires detection point information of the LIDAR 1 using the other-vehicle recognizing unit 11 in S10. The other-vehicle recognizing unit 11 acquires the detection point information on the detection points detected by the LIDAR 1.

In S12, the ECU 10 performs grouping of the detection points using the other-vehicle recognizing unit 11. The other-vehicle recognizing unit 11 groups the detection points satisfying a predetermined condition as detection points indicating the same object.

In S14, the ECU 10 recognizes another vehicle N1 using the other-vehicle recognizing unit 11. The other-vehicle recognizing unit 11 recognizes the other vehicle N1 traveling near the vehicle of interest M by performing pattern recognition on the grouped detection points using a predetermined vehicle model. The other-vehicle recognizing unit 11 recognizes the size of the other vehicle based on the detection point information of the LIDAR 1.

In S16, the ECU 10 starts tracking the other vehicle N1 using the other-vehicle tracking unit 12. The other-vehicle tracking unit 12 starts tracking the other vehicle N1 based on the detection point information of the LIDAR 1. The other-vehicle tracking unit 12 continues to perform the tracking until the other vehicle N1 is lost.

[Process routine of setting set distance] FIG. 5B is a flowchart illustrating a process routine of setting the set distance La. The flowchart illustrated in FIG. 5B is performed when tracking the other vehicle is performed in S16 of FIG. 5A. The flowchart illustrated in FIG. 5B may be performed when it is determined in S30 of FIG. 6 which will be described later that the size of the other vehicle N1 has been enlarged.

As illustrated in FIG. 5B, the ECU 10 recognizes the traveling condition of the other vehicle N1 using the other-vehicle recognizing unit 11 in S20. The other-vehicle recognizing unit 11 recognizes the traveling condition (such as a vehicle speed and an acceleration) of the other vehicle based on the detection point information of the LIDAR 1, the vehicle speed information of the vehicle speed sensor 2, and the acceleration information of the acceleration sensor 3.

In S22, the ECU 10 sets the set distance La using the penetrable object recognizing unit 15. The penetrable object recognizing unit 15 sets the set distance La based on the traveling condition of the other vehicle N1. Thereafter, the ECU 10 ends this process routine. When tracking of the other vehicle N1 is continuously performed, the ECU 10 restarts the process routine from S20 after a predetermined time elapses.

Figure 6:
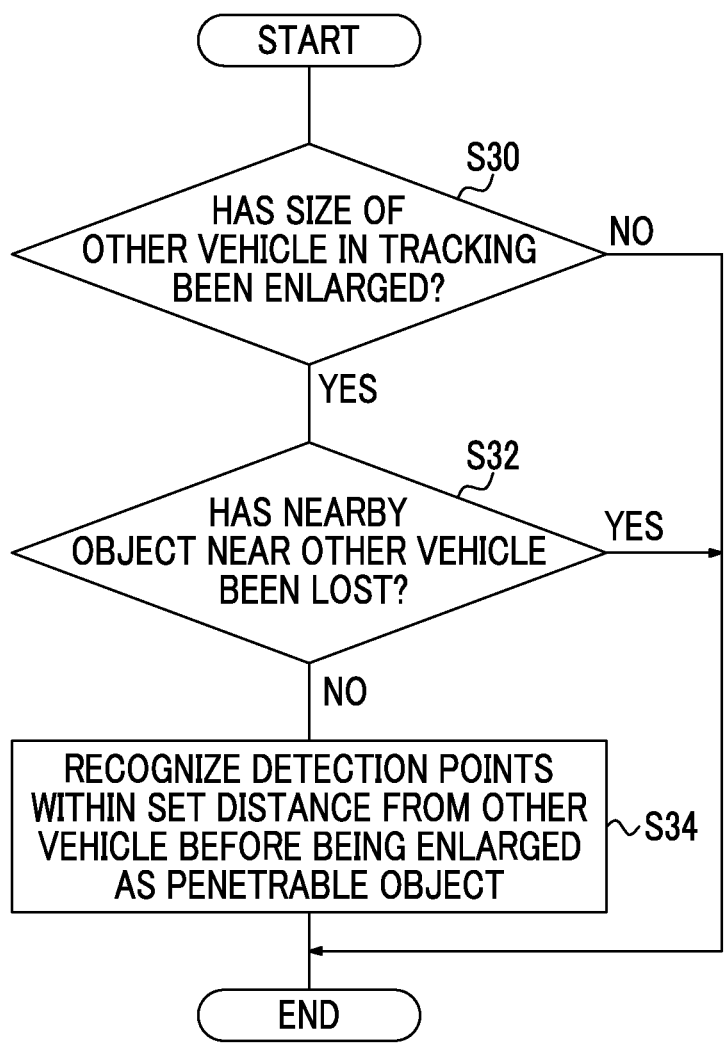
FIG. 6 is a flowchart illustrating a process routine of recognizing a penetrable object.

[Process routine of recognizing penetrable object] FIG. 6 is a flowchart illustrating a process routine of recognizing a penetrable object. The flowchart illustrated in FIG. 6 is performed when tracking of the other vehicle has been performed in S16 of FIG. 5A.

As illustrated in FIG. 6, the ECU 10 determines whether the size of the other vehicle N1 has been enlarged using the enlargement determining unit 13 in S30. When the enlargement determining unit 13 determines that the size of the other vehicle N1 which is tracked has not been enlarged (NO in S30), the ECU 10 ends this process routine. Thereafter, when tracking of the other vehicle N1 is continuously performed, the ECU 10 performs the determination of S30 again after a predetermined time elapses. When the enlargement determining unit 13 determines that the size of the other vehicle N1 which is tracked has been enlarged (YES in S30), the ECU 10 performs S32.

In S32, the ECU 10 determines whether a nearby object N2 near the other vehicle N1 has been lost using the "lost" determining unit 14. When the "lost" determining unit 14 determines that the nearby object N2 near the other vehicle N1 has been lost (YES in S32), the ECU 10 ends this process routine. Thereafter, when tracking of the other vehicle N1 is continuously performed, the ECU 10 performs the determination of S30 again after a predetermined time elapses. When the "lost" determining unit 14 determines that the nearby object N2 has not been lost (NO in S32), the ECU 10 performs S34.

In S34, the ECU 10 recognizes a penetrable object using the penetrable object recognizing unit 15. The penetrable object recognizing unit 15 recognizes the detection points located near the other vehicle N1 before being enlarged among the detection points detected by the LIDAR 1 as a penetrable object. Specifically, the penetrable object recognizing unit 15 recognizes the detection points located within the set distance La from the other vehicle N1 before being enlarged as a penetrable object. Thereafter, the ECU 10 ends this process routine. When tracking of the other vehicle N1 is continuously performed, the ECU 10 performs the determination of S30 again after a predetermined time elapses.

Figure 7:
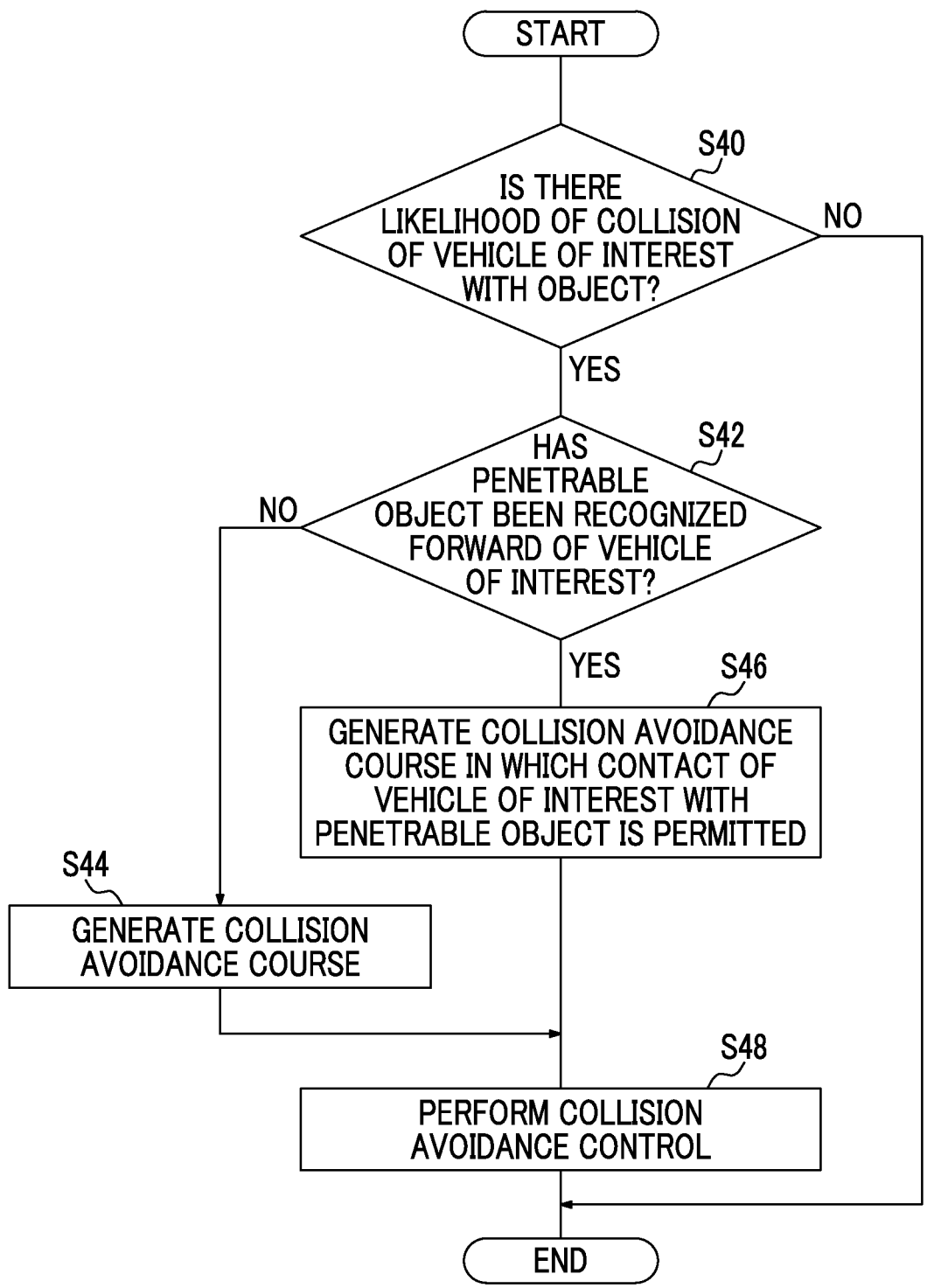
FIG. 7 is a flowchart illustrating collision avoidance control.

[Collision avoidance control] FIG. 7 is a flowchart illustrating collision avoidance control. The flowchart illustrated in FIG. 7 is performed while the vehicle of interest M is traveling.

As illustrated in FIG. 7, the ECU 10 determines whether there is a likelihood of collision of the vehicle of interest M with an obstacle in the traveling direction of the vehicle of interest M using the collision avoidance determining unit 16 in S40. The collision avoidance determining unit 16 performs the determination based on the detection point information of the LIDAR 1. When the collision avoidance determining unit 16 determines that there is no likelihood of collision of the vehicle of interest M with an obstacle (NO in S40), the ECU 10 ends this process routine. Thereafter, the ECU 10 restarts the process routine from S40 after a predetermined time elapses. When the collision avoidance determining unit 16 determines that there is a likelihood of collision of the vehicle of interest M with an obstacle (YES in S40), the ECU 10 performs S42.

In S42, the ECU 10 determines whether a penetrable object forward of the vehicle of interest M has been recognized by the penetrable object recognizing unit 15 using the collision avoidance determining unit 16. When the collision avoidance determining unit 16 determines that a penetrable object forward of the vehicle of interest M has not been recognized (NO in S42), the ECU 10 performs S44. When the collision avoidance determining unit 16 determines that a penetrable object forward of the vehicle of interest M has been recognized (YES in S42), the ECU 10 performs S46.

In S44, the ECU 10 generates a collision avoidance course using the collision avoidance course generating unit 17. The collision avoidance course generating unit 17 generates the collision avoidance course using a known technique. Thereafter, the ECU 10 performs S48.

In S46, the ECU 10 generates a collision avoidance course in which contact of the vehicle of interest M with a penetrable object is permitted using the collision avoidance course generating unit 17. Thereafter, the ECU 10 performs S48.

In S48, the ECU 10 performs collision avoidance control using the collision avoidance control unit 18. The collision avoidance control unit 18 performs the collision avoidance control for avoidance of collision of the vehicle of interest M with an obstacle according to the collision avoidance course generated by the collision avoidance course generating unit 17. Thereafter, the ECU 10 ends this process routine. The ECU 10 restarts the process routine from S40 after a predetermined time elapses.

[Effects of collision avoidance system according to first embodiment] In the collision avoidance system 100 (the object recognizing device 101) according to the first embodiment, when it is determined that the size of the other vehicle N1 has been enlarged based on the detection point information of the LIDAR 1 and it is determined that the nearby object N2 has not been lost, the detection points located near the other vehicle N1 before being enlarged are recognized as a penetrable object from the fact that the size of the other vehicle N1 is considered to have been enlarged due to a penetrable object such as an exhaust gas G or a spray of water Sp generated near the other vehicle N1. Accordingly, with the collision avoidance system 100, it is possible to appropriately recognize the penetrable object generated near the other vehicle N1.

With the collision avoidance system 100 (the object recognizing device 101), since the detection points located within the set distance La from the other vehicle N1 are recognized as a penetrable object, it is possible to easily recognize the penetrable object. In the collision avoidance system 100, from the fact that the range of an exhaust gas or a spray of water is affected by the traveling condition of the other vehicle, it is possible to appropriately recognize a penetrable object by changing the set distance La based on the traveling condition of the other vehicle.

In the collision avoidance system 100, since a penetrable object can be appropriately recognized as described above, it is possible to prevent a penetrable object from being erroneously recognized as an obstacle to be avoided and narrowing choices for the collision avoidance course by generating the collision avoidance course in which contact of the vehicle of interest M with the penetrable object is permitted.

In the collision avoidance system 100, since the priority level of the collision avoidance course in which the closest approach distance between the vehicle of interest M and an obstacle is equal to or greater than the approach threshold value and the vehicle of interest M comes in contact with a penetrable object is set to be higher than the priority level of the collision avoidance course in which the closest approach distance between the vehicle of interest M and the obstacles (such as the lane changing vehicle N3) is less than the approach threshold value, it is possible to prevent a risk of contact of the vehicle of interest M with an obstacle from increasing due to presence of a penetrable object.

Figure 8:
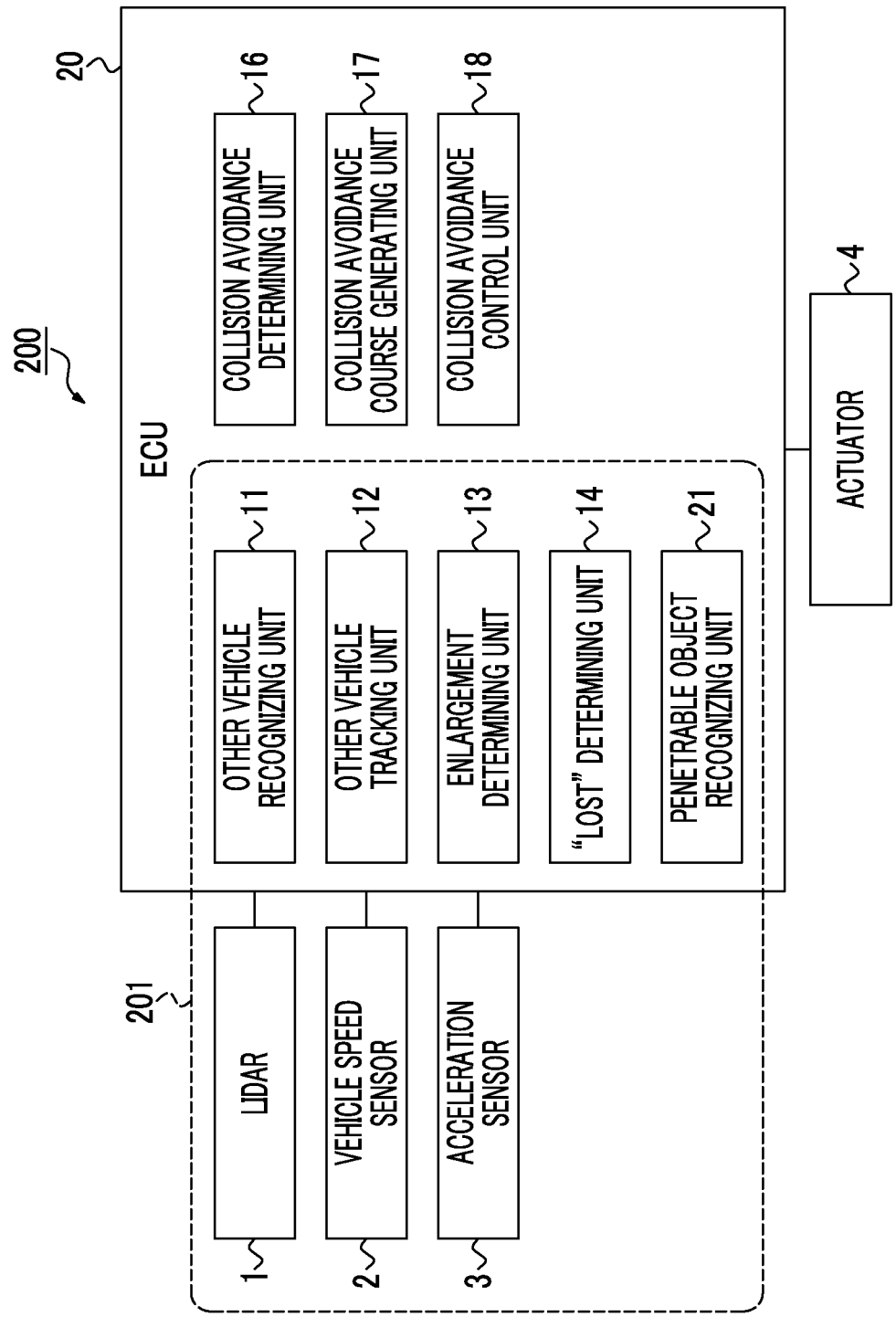
FIG. 8 is a block diagram illustrating a collision avoidance system according to the second embodiment.

[Second embodiment] A collision avoidance system 200 (an object recognizing device 201) according to a second embodiment will be described below. FIG. 8 is a block diagram illustrating a collision avoidance system according to the second embodiment. The collision avoidance system 200 illustrated in FIG. 8 is different from that in the first embodiment, in only a technique of recognizing a penetrable object.

Specifically, when the enlargement determining unit 13 determines that the size of another vehicle N1 has been enlarged and the "lost" determining unit 14 determines that a nearby object N2 of the other vehicle N1 has not been lost, a penetrable object recognizing unit 21 of an ECU 20 according to the second embodiment recognizes detection points located within a first distance from a lateral side of the other vehicle N1 before being enlarged among detection points detected by the LIDAR 1 as a penetrable object. The penetrable object recognizing unit 21 recognizes detection points located within a second distance from a rear side of the other vehicle N1 before being enlarged as a penetrable object.

Figure 3B:
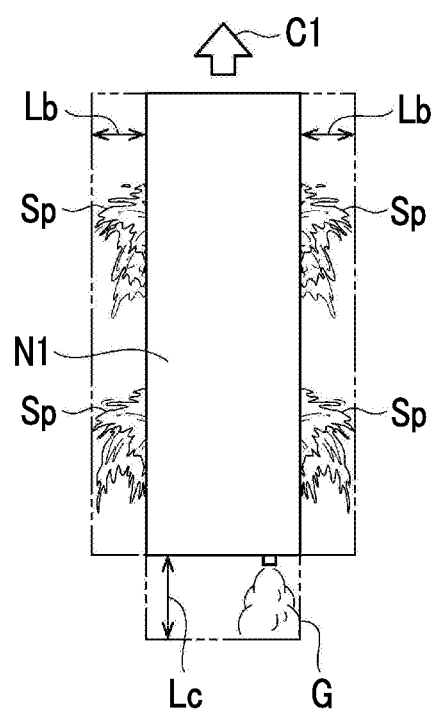
FIG. 3B is a plan view illustrating recognition of a penetrable object according to a second embodiment.

FIG. 3B is a plan view illustrating recognition of a penetrable object according to the second embodiment. A first distance Lb and a second distance Lc are illustrated in FIG. 3B. In a situation illustrated in FIG. 3B, the penetrable object recognizing unit 21 recognizes detection points (detection points based on a spray of water Sp) located within the first distance Lb from a lateral side of the other vehicle N1 before being enlarged as a penetrable object. The penetrable object recognizing unit 21 recognizes detection points (detection points based on an exhaust gas G) located within the second distance Lc from the rear side of the other vehicle N1 before being enlarged as a penetrable object.

The penetrable object recognizing unit 21 changes the first distance Lb and the second distance Lc based on the traveling condition of the other vehicle. Specifically, from the fact that a range of the spray of water Sp generated on a lateral side by the other vehicle N1 is considered to extend as a vehicle speed of the other vehicle N1 increases, the penetrable object recognizing unit 21 sets the first distance Lb to be longer when the vehicle speed of the other vehicle N1 is equal to or higher than the vehicle speed threshold value than when the vehicle speed of the other vehicle N1 is lower than the vehicle speed threshold value.

From the fact that a range of the exhaust gas G generated by the other vehicle N1 is considered to extend as an acceleration of the other vehicle N1 increases, the penetrable object recognizing unit 21 sets the second distance Lc to be longer when the acceleration of the other vehicle N1 is equal to or higher than the acceleration threshold value than when the acceleration of the other vehicle N1 is lower than the acceleration threshold value.

The penetrable object recognizing unit 21 may change the first distance Lb based on the total length of the other vehicle N1 recognized by the other-vehicle tracking unit 12. From the fact that a range of the spray of water Sp generated by the other vehicle N1 is considered to extend as the length of the other vehicle N1 increases, the penetrable object recognizing unit 21 may set the first distance Lb to be longer when the total length of the other vehicle N1 is equal to or greater than the length threshold value than when the total length of the other vehicle N1 is less than the length threshold value.

Changing of the first distance Lb and the second distance Lc is not limited to the above description. The penetrable object recognizing unit 21 may set the first distance Lb to increase continuously or stepwise as the vehicle speed of the other vehicle N1 increases. The penetrable object recognizing unit 21 may set to the second distance Lc to increase continuously or stepwise as the acceleration of the other vehicle N1 increases. At least one of the first distance Lb and the second distance Lc may be a fixed value. When both the first distance Lb and the second distance Lc are a fixed value, the other-vehicle recognizing unit 11 may not recognize the traveling condition of the other vehicle N1. Furthermore, in the above case, the vehicle speed sensor 2 and the acceleration sensor 3 are not necessary.

[Process routine of collision avoidance system according to second embodiment] A process routine which is performed by the collision avoidance system 200 (the object recognizing device 201) according to the second embodiment will be described below. The other vehicle recognizing process routine and the collision avoidance control are the same as described in the first embodiment and thus description thereof will not be repeated.

Figure 9B:
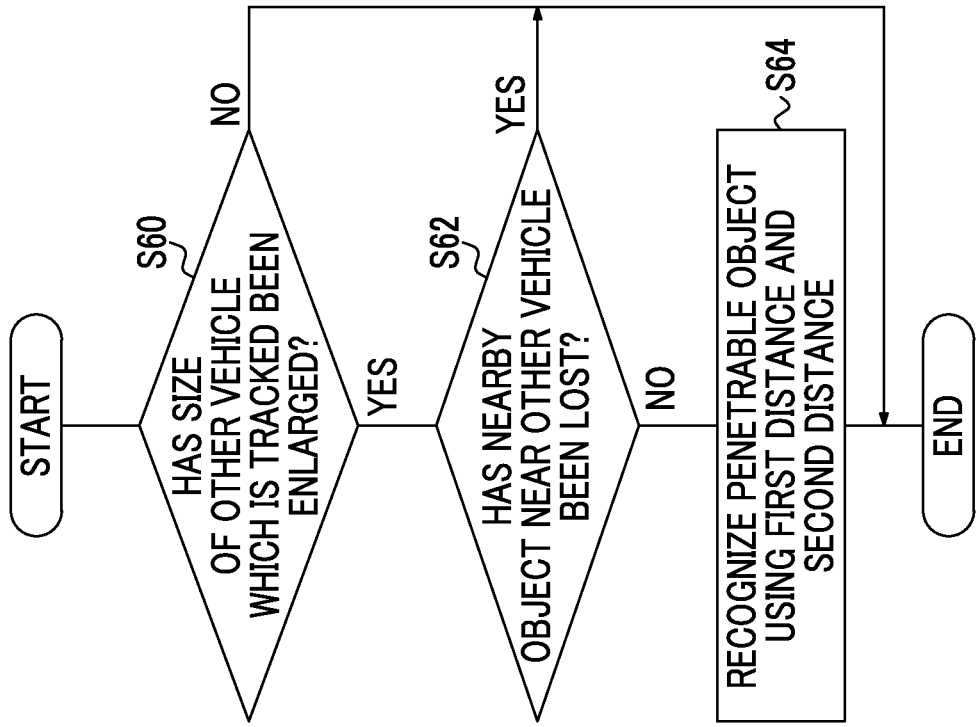
FIG. 9B is a flowchart illustrating a process routine of recognizing a penetrable object according to the second embodiment.
Figure 9A:
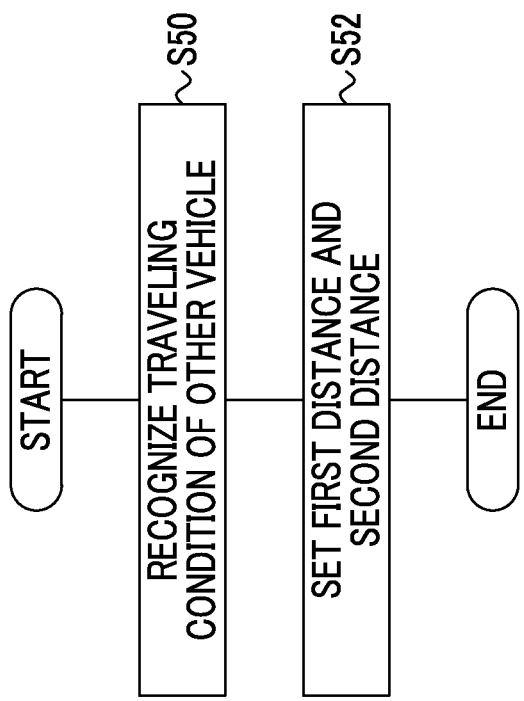
FIG. 9A is a flowchart illustrating a process routine of setting a first distance and a second distance.

[Process routine of setting first distance and second distance] FIG. 9A is a flowchart illustrating a process routine of setting the first distance and the second distance. The flowchart illustrated in FIG. 9A is performed when tracking of the other vehicle has been performed in S16 of FIG. 5A. The flowchart illustrated in FIG. 9A may be performed when it is determined in S30 of FIG. 6 that the size of the other vehicle N1 has been enlarged.

As illustrated in FIG. 9A, in S50, the ECU 20 recognizes the traveling condition of another vehicle N1 using the other-vehicle recognizing unit 11. The other-vehicle recognizing unit 11 recognizes the traveling condition (such as the vehicle speed and the acceleration) of the other vehicle based on the detection point information of the LIDAR 1, the vehicle speed information of the vehicle speed sensor 2, and the acceleration information of the acceleration sensor 3.

In S52, the ECU 20 sets the first distance Lb and the second distance Lc using the penetrable object recognizing unit 21. The penetrable object recognizing unit 21 sets the first distance Lb and the second distance Lc based on the traveling condition of the other vehicle N1. Thereafter, the ECU 20 ends this process routine. When tracking of the other vehicle N1 is continuously performed, the ECU 20 restarts the process routine from S50 after a predetermined time elapses.

[Process routine of recognizing penetrable object] FIG. 9B is a flowchart illustrating a process routine of recognizing a penetrable object according to the second embodiment. The flowchart illustrated in FIG. 9B is performed when tracking of the other vehicle has been performed in S16 of FIG. 5A.

As illustrated in FIG. 9B, the ECU 20 determines whether the size of the other vehicle N1 which is tracked has been enlarged using the enlargement determining unit 13 in S60. When the enlargement determining unit 13 determines that the size of the other vehicle N1 has not been enlarged (NO in S60), the ECU 20 ends this process routine. Thereafter, when tracking of the other vehicle N1 is continuously performed, the ECU 20 performs the determination of S60 again after a predetermined time elapses. When the enlargement determining unit 13 determines that the size of the other vehicle N1 has been enlarged (YES in S60), the ECU 20 performs S62.

In S62, the ECU 20 determines whether a nearby object N2 near the other vehicle N1 has been lost using the "lost" determining unit 14. When the "lost" determining unit 14 determines that the nearby object N2 near the other vehicle N1 has been lost (YES in S62), the ECU 20 ends this process routine. Thereafter, when tracking of the other vehicle N1 is continuously performed, the ECU 20 performs the determination of S60 again after a predetermined time elapses. When the "lost" determining unit 14 determines that the nearby object N2 has not been lost (NO in S62), the ECU 20 performs S64.

In S64, the ECU 20 recognizes a penetrable object using the penetrable object recognizing unit 21. The penetrable object recognizing unit 21 recognizes detection points located near the other vehicle N1 before being enlarged among detection points detected by the LIDAR 1.

Specifically, the penetrable object recognizing unit 21 recognizes the detection points located within the first distance from a lateral side of the other vehicle N1 before being enlarged as a penetrable object. The penetrable object recognizing unit 21 recognizes the detection points located within the second distance from a rear side of the other vehicle N1 before being enlarged as a penetrable object. Thereafter, the ECU 20 ends this process routine. When tracking of the other vehicle N1 is continuously performed, the ECU 20 performs the determination of S60 again after a predetermined time elapses.

[Effects of collision avoidance system according to second embodiment] With the collision avoidance system 200 (the object recognizing device 201) according to the second embodiment, it is possible to appropriately recognize a penetrable object such as a spray of water Sp and an exhaust gas G by using the first distance Lb in consideration of the spray of water Sp generated on a lateral side of the other vehicle N1 and the second distance Lc in consideration of the exhaust gas G generated rearward of the other vehicle N1 to recognize a penetrable object.

The range of the spray of water or the like is considered to extend to a lateral side of the other vehicle N1 as the vehicle speed of the other vehicle N1 increases. In the collision avoidance system 200 (the object recognizing device 201), it is possible to appropriately recognize a penetrable object such as a spray of water or the like by setting the first distance Lb to be longer when the vehicle speed of the other vehicle N1 is equal to or higher than the vehicle speed threshold value than when the vehicle speed of the other vehicle N1 is lower than the vehicle speed threshold value.

The range of the exhaust gas or the like is considered to extend rearward from the other vehicle N1 as the acceleration of the other vehicle N1 increases. In the collision avoidance system 200 (the object recognizing device 201), it is possible to appropriately recognize a penetrable object such as an exhaust gas or the like by setting the second distance Lc to be longer when the acceleration of the other vehicle N1 is equal to or higher than the acceleration threshold value than when the acceleration of the other vehicle N1 is lower than the acceleration threshold value.

When the total length of the other vehicle increases, the number of vehicle wheels of the other vehicle is considered to be large or the weight of the other vehicle is considered to be large. Therefore, the range of the spray of water or the like is considered to extend to a lateral side of the other vehicle In the collision avoidance system 200 (the object recognizing device 201), t, it is possible to appropriately recognize a penetrable object such as a spray of water or the like by setting the first distance Lb to be longer when the total length of the other vehicle is equal to or greater than the length threshold value than when the total length of the other vehicle is less than the length threshold value.

While exemplary embodiments of the disclosure have been described above, the disclosure is not limited to the embodiments. The disclosure can be implemented in various forms subjected to various modifications and improvements based on knowledge of those skilled in the art as well as the above-mentioned embodiments.

A case in which the object recognizing device 101 or 201 is included in the collision avoidance system 100 or 200 has been described in the embodiments, but the object recognizing device 101 or 201 does not need to constitute a part of the collision avoidance system. The object recognizing device 101 or 201 may be used as an independent device. A recognition result of a penetrable object by the object recognizing device 101 or 201 can be effectively used for driving support control of supporting driving of a driver and attraction of attention of a driver.

The penetrable object recognizing unit 15 or 21 may improve recognition accuracy of a penetrable object using a variety of information in addition to the detection point information of the LIDAR 1. When the enlargement determining unit 13 determines that the size of the other vehicle N1 has been enlarged and the "lost" determining unit 14 determines that a nearby object N2 near the other vehicle N1 has not been lost, the penetrable object recognizing unit 15 or 21 may recognize a penetrable object near the other vehicle N1 based on the detection point information of the LIDAR 1 and an image captured by a camera of the vehicle of interest M. When a position of a tire of the other vehicle N1 can be recognized in an image captured by a camera, the penetrable object recognizing unit 15 or 21 may enhance recognition accuracy of a penetrable object by recognizing the detection points near the tire as a penetrable object as a penetrable object. That is because a spray of water Sp is considered to be generated in the vicinity of the tire. Similarly, when an opening position of an exhaust pipe of the other vehicle N1 can be recognized in an image captured by a camera, the penetrable object recognizing unit 15 or 21 may enhance recognition accuracy of a penetrable object by recognizing the detection points near the opening position of the exhaust gas as penetrable object. The penetrable object recognizing unit 15 or 21 may recognize a penetrable object in consideration of the direction of the other vehicle N1.

The penetrable object recognizing unit 15 or 21 may recognize a penetrable object using a rain detection result of a raindrop sensor of the vehicle of interest M. Only when rain has been detected by the raindrop sensor of the vehicle of interest M, the penetrable object recognizing unit 15 or 21 may recognize a penetrable object on a lateral side of the other vehicle N1 in consideration of a spray of water Sp. Weather information may be acquired via a communication network or the like. The penetrable object recognizing unit 15 or 21 may recognize a penetrable object using a detection result of a temperature sensor of the vehicle of interest M. The exhaust gas G is considered to be easily detected by the LIDAR 1 when the exhaust gas is condensed at a low temperature. The penetrable object recognizing unit 15 or 21 may recognize a penetrable object based on other vehicle information (such as vehicle speed or acceleration information of the other vehicle N1 and puddle recognition information based on an image captured by a camera of the other vehicle N1) acquired through vehicle-to-vehicle communication with the other vehicle N1.

The collision avoidance system 100 or 200 may include a map database including information of puddle frequent-formation spots in which a puddle is easily formed and a vehicle position recognizing unit that recognizes a position of the vehicle of interest M on a map based on GPS signals. In this case, the penetrable object recognizing unit 15 or 21 may recognize a penetrable object on a lateral side of the other vehicle N1 in consideration of a spray of water Sp when the vehicle of interest M travels in the puddle frequent-formation spots.

The collision avoidance system 100 or 200 may include a water spray Sp detecting unit that detects a spray of water Sp of the vehicle of interest M and may recognize a penetrable object on a lateral side of the other vehicle N1 in consideration of the spray of water Sp when the spray of water Sp of the vehicle of interest M has been detected. For example, when the vehicle of interest M travels in the puddle frequent-formation spots and the vehicle speed of the vehicle of interest M is changed in a predetermined pattern, the collision avoidance system 100 or 200 may consider that a spray of water Sp has occurred by the vehicle of interest M.

When a penetrable object has been recognized, the collision avoidance system 100 or 200 may generate a collision avoidance course on the assumption that there is no penetrable object. The collision avoidance system 100 or 200 may perform generation of a collision avoidance course and collision avoidance control using detection results of camera or other on-board sensors in addition to the LIDAR 1.

What is claimed is:

1. An object recognizing device that recognizes an object near a vehicle based on detection point information output by a light detection and ranging (LIDAR) sensor which is mounted in the vehicle, the object recognizing device comprising a processor programmed to:
   recognize existence of another vehicle traveling near the vehicle and a size of the other vehicle based on the detection point information;
   track the other vehicle based on the size of the other vehicle;
   determine whether the size of the other vehicle has been enlarged;
   determine whether a nearby object near the other vehicle has been lost based on the detection point information output by the LIDAR sensor when the processor determines that the size of the other vehicle has been enlarged; and
   output a result that a detection point located near the other vehicle before being enlarged among detection points detected by the LIDAR sensor is recognized as a penetrable object other than the other vehicle when the processor determines that the size of the other vehicle has been enlarged and that the nearby object has not been lost.

2. The object recognizing device according to claim 1, wherein
   the processor is further programmed to recognize the detection points located within a set distance from the other vehicle before being enlarged as the penetrable object.

3. The object recognizing device according to claim 2, wherein the processor is further programmed to
   recognize a traveling condition of the other vehicle, and
   set the set distance based on the traveling condition of the other vehicle.

4. The object recognizing device according to claim 1, wherein the processor is further programmed to
   recognize a vehicle speed of the other vehicle based on the detection point information, and
   recognize the detection points located within a first distance from a lateral side of the other vehicle before being enlarged as the penetrable object and to set the first distance to be longer when the vehicle speed of the other vehicle is equal to or higher than a vehicle speed threshold value than when the vehicle speed of the other vehicle is lower than the vehicle speed threshold value.

5. The object recognizing device according to claim 1, wherein the processor is further programmed to
   recognize a total length of the other vehicle based on the detection point information, and
   recognize the detection points located within a first distance from a lateral side of the other vehicle before being enlarged as the penetrable object and to set the first distance to be longer when the total length of the other vehicle is equal to or greater than a length threshold value than when the total length of the other vehicle is less than the length threshold value.

6. The object recognizing device according to claim 1, wherein the processor is further programmed to
   recognize an acceleration of the other vehicle based on the detection point information, and
   recognize the detection points located within a second distance from a rear side of the other vehicle before being enlarged as the penetrable object and to set the second distance to be longer when the acceleration of the other vehicle is equal to or higher than an acceleration threshold value than when the acceleration of the other vehicle is lower than the acceleration threshold value.

7. A collision avoidance system that performs collision avoidance control for avoiding collision of the vehicle with an obstacle which is to be avoided by the vehicle, the collision avoidance system comprising the object recognizing device according to claim 1, wherein the processor is further programmed to:
   generate a collision avoidance course in which collision of the vehicle with the obstacle is avoided based on the detection point information and to generate the collision avoidance course in which contact of the vehicle with the penetrable object is permitted when the processor recognizes the penetrable object in front of the vehicle; and perform the collision avoidance control of the vehicle according to the collision avoidance course.

8. The collision avoidance system according to claim 7, wherein the processor is further configured to set a priority level of the collision avoidance course in which a closest approach distance between the vehicle and the obstacle is equal to or greater than an approach threshold value and the vehicle comes in contact with the penetrable object to be higher than a priority level of the collision avoidance course in which the closest approach distance between the vehicle and the obstacle is less than the approach threshold value.

9. An object recognizing device configured to recognize an object near a vehicle based on detection point information output by a light detection and ranging (LIDAR) sensor which is mounted in the vehicle, the object recognizing device comprising: an electronic control unit configured to:

recognize existence of another vehicle traveling near the vehicle and a size of the other vehicle based on the detection point information;

track the other vehicle based on the size of the other vehicle;

determine whether the size of the other vehicle which is tracked has been enlarged;

determine whether a nearby object near the other vehicle has been lost based on the detection point information of the LIDAR sensor when determining that the size of the other vehicle has been enlarged; and output a result when determining that the size of the other vehicle has been enlarged and that the nearby object has not been lost, the result being that a detection point located near the other vehicle before being enlarged among detection points is recognized as a penetrable object other than the other vehicle, the detection points being detected by the LIDAR sensor.

* * * * *